United States Patent [19]

Kliewer

[11] Patent Number: 4,490,317

[45] Date of Patent: Dec. 25, 1984

[54] METHOD AND APPARATUS FOR MANUFACTURING STRESS-SKIN PANELS

[75] Inventor: Aron Kliewer, Lake Arrowhead, Calif.

[73] Assignee: Fleetwood Enterprises, Inc., Riverside, Calif.

[21] Appl. No.: 158,928

[22] Filed: Jun. 12, 1980

[51] Int. Cl.³ .............................................. B29D 27/04
[52] U.S. Cl. .................................................... 264/46.5
[58] Field of Search ...................... 264/46.5, 101, 261; 425/817 R, 123

[56] References Cited

U.S. PATENT DOCUMENTS

| | | | |
|---|---|---|---|
| 3,057,007 | 10/1962 | Vanden Berg | 264/46.5 X |
| 3,090,078 | 5/1963 | Ackles | 264/46.5 |
| 3,311,948 | 4/1967 | Axelsonn | 264/46.5 X |
| 3,402,520 | 9/1968 | Lee et al. | |
| 3,759,479 | 9/1973 | Howell et al. | |
| 4,012,186 | 3/1977 | Ramazzotti et al. | |
| 4,051,209 | 9/1977 | Tabler | 264/46.5 X |

*Primary Examiner*—Philip Anderson
*Attorney, Agent, or Firm*—Edward D. O'Brian; K. H. Boswell

[57] ABSTRACT

Stress-skin panels can be manufactured by locating the skins of such panels against mold surfaces which are spaced from one another so that spacers separate these mold surfaces along their side edges. A composition capable of setting up so as to form a rigid, porous foam which is bonded to the skins is introduced into the space between the mold surfaces and the spacers through the use of a movable nozzle structure which introduces substantially equal quantities of the composition along a line extending between the spacers. The nozzle structure is moved in the space between the mold surfaces from one end of the space to the other in such a manner that uniform amounts of the composition are placed within the space along the length of the space. When the composition has become rigid the apparatus is disassembled and the panel produced is removed from it.

9 Claims, 4 Drawing Figures

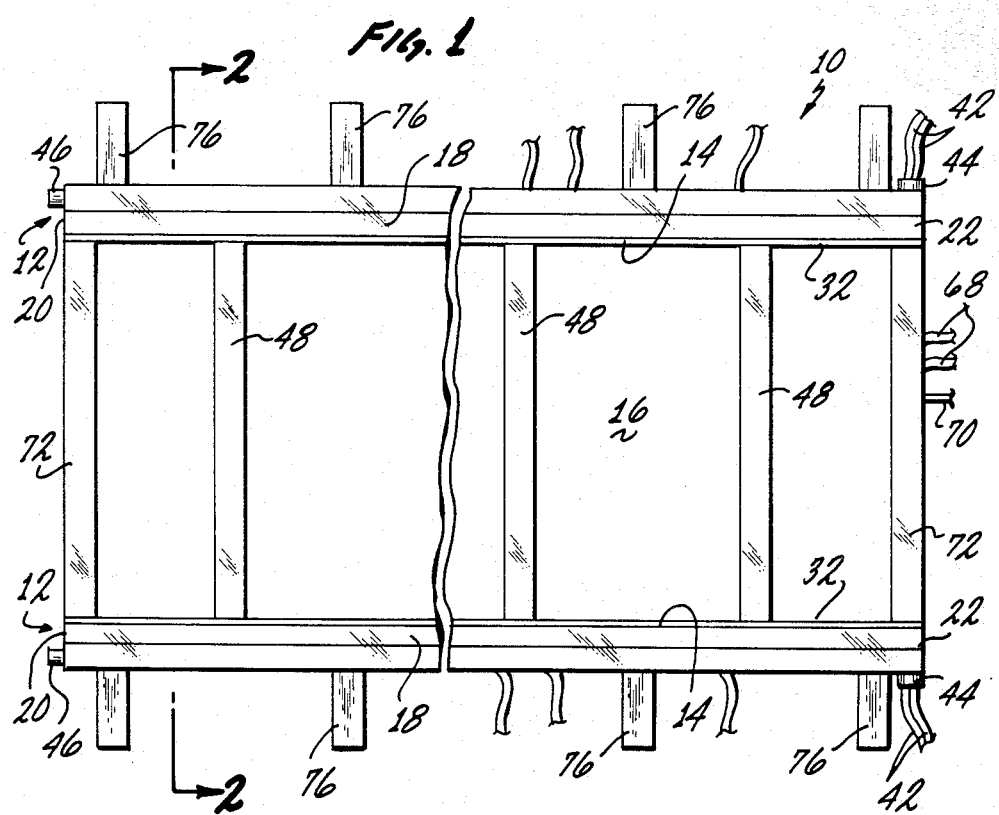
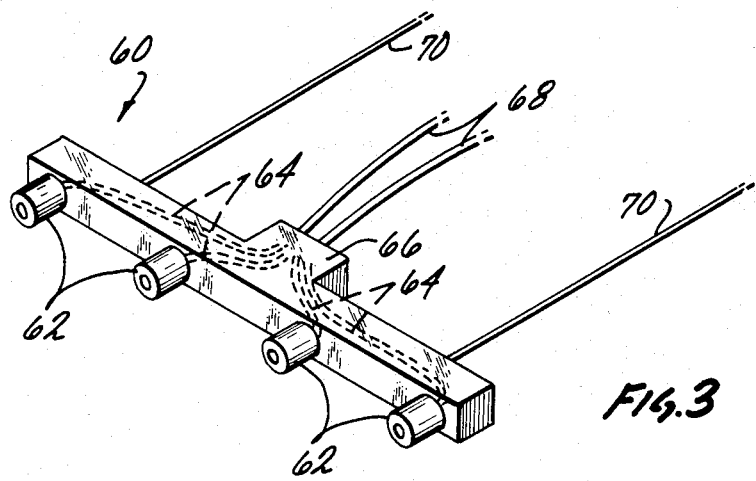

METHOD AND APPARATUS FOR MANUFACTURING STRESS-SKIN PANELS

BACKGROUND OF THE INVENTION

The invention set forth in this specification pertains to both a new and improved method and a new and improved apparatus for manufacturing stress-skin panels.

Such panels normally consist of two so-called "skins" such as flat sheets or substantially flat sheets of aluminum or another material separated by and bonded to a so-called core which is normally of a comparatively rigid, cellular character. Frequently such cores have consisted of rigid, porous polymer compositions such as cellular polystyrene, porous polyurethane and the like, although on many occasions such cores have also been of a number of different types. Although such stress-skin panels have been manufactured in many different ways it is considered that most conventionally they have been manufactured by conventional laminating techniques serving to laminate the two skins of such a panel on opposite sides of the core of such a panel.

Although such laminating techniques are unquestionably utilitarian it is not considered that they are as inexpensive as desired in connection with the manufacture of stress-skin panels. Also it is considered that such laminating techniques are disadvantageous for use in manufacturing stress-skin panels because normally side edges of the panels produced using these techniques are not especially shaped as as to be capable of being directly interlocked with the side edges of other panels in forming a joint such as is used in connection with various types of building applications. The cost of shaping such side edges so that they can be used in forming such joints is undesirably expensive. Further, on occasion it is considered that such laminating techniques are disadvantageous as not providing stress-skin panels in which the skins are satisfactorily and uniformly bonded to the cores of such panels.

As a result of the recognition of such factors a number of efforts have been made at providing stress-skin panels constructed using other techniques than laminating techniques as briefly indicated in the preceding discussion. It is not considered that an understanding of the present invention requires a detailed discussion of such alternate manufacturing techniques. Although such alternate techniques can be considered desirable in some respects, they are also considered entirely undesirable in others for a wide variety of different reasons.

Among such reasons are problems in producing stress-skin panels having substantially uniform characteristics between their sides and having adequately uniform dimensions in which the skins of such panels are effectively bonded to the cores of such panels. In connection with both of these matters it is noted that a stress-skin panel should employ a core having substantially uniform physical properties between its sides if it is to be acceptable in many applications.

SUMMARY OF THE INVENTION

As a result of considerations as briefly indicated in the preceding it is considered that there is a need for a new and improved method of manufacturing stress-skin panels and it is considered that there is an interrelated need for new and improved apparatus for use in manufacturing stress-skin panels. The invention described in this specification is intended to fulfill these related needs.

More specifically the invention is intended to provide a new and improved method for manufacturing stress-skin panels which can be easily and conveniently carried out at a comparatively nominal cost, which results in the production of stress-skin panels in which the skins are adequately bonded to the cores and in which the physical properties of the panels are substantially uniform between the sides of the panels throughout the lengths and widths of such panels.

Also the invention is intended to provide new and improved apparatus for carrying out the noted method which may be easily and conveniently constructed at a comparatively nominal cost, which is relatively easy to use and which is capable of performing satisfactorily over a prolonged period with minimal maintenance. Both the method and apparatus described are of such a character as to provide panels having edge configurations capable of being used to directly interlock with corresponding panels so as to form joints between adjacent panels having adequate strength characteristics for many utilizations.

In accordance with this invention these objectives pertaining to an apparatus are achieved by providing an apparatus for use in producing a stress-skin panel which includes: two elongated forms, each of said forms having a mold surface bordered by side edges and ends, said mold surfaces corresponding to one another as to external dimension, connecting means for holding said forms so that said mold surfaces are spaced from one another and so that the side edges and ends of each of said surfaces are adjacent to one another, filling means for filling the space between said mold surfaces with a composition capable of forming a coherent, unitary core, in which the improvement comprises: two separate spacing means for closing off the adjacent side edges of said surfaces between said forms, separate holding means located on each of said forms for releasably holding the skins of said stress-skin panels against said mold surfaces so that said skins extend generally between said side edges and said ends, said filling means including movable nozzle means for distributing said composition substantially equal amounts of said composition along a line extending between said side edges and transport means for moving said movable nozzle means from adjacent to one end of each of said surfaces to adjacent to the other end of each of said surfaces as said nozzle means deposits said composition within said space and as the area within said space becomes filled with said composition.

Also in accordance with this invention the objectives pertaining to a method are achieved by providing a process for using an apparatus in which two skins are held against mold surfaces spaced from one another as the space between the skins is filled with a fluid composition capable of automatically forming a rigid, porous core between said skins in which the improvement comprises: filling the space between said skins using a movable nozzle structure which distributes substantially equal amounts of said composition within all areas within said space and, concurrently controlling the temperatures of said mold surfaces so as to indirectly regulate the temperature within the space between the mold surfaces so as to control the formation of said porous, rigid core so that said porous, rigid core has a substantially uniform composition.

BRIEF DESCRIPTION OF THE DRAWING

The invention is best more fully described with reference to the accompanying drawing in which:

FIG. 1 is a side elevational view of an apparatus in accordance with this invention, this view being of a semi-diagrammatical character;

FIG. 3 is an isometric view of a nozzle structure as employed as a part of the apparatus indicated in the preceding figures.

Figure 2:
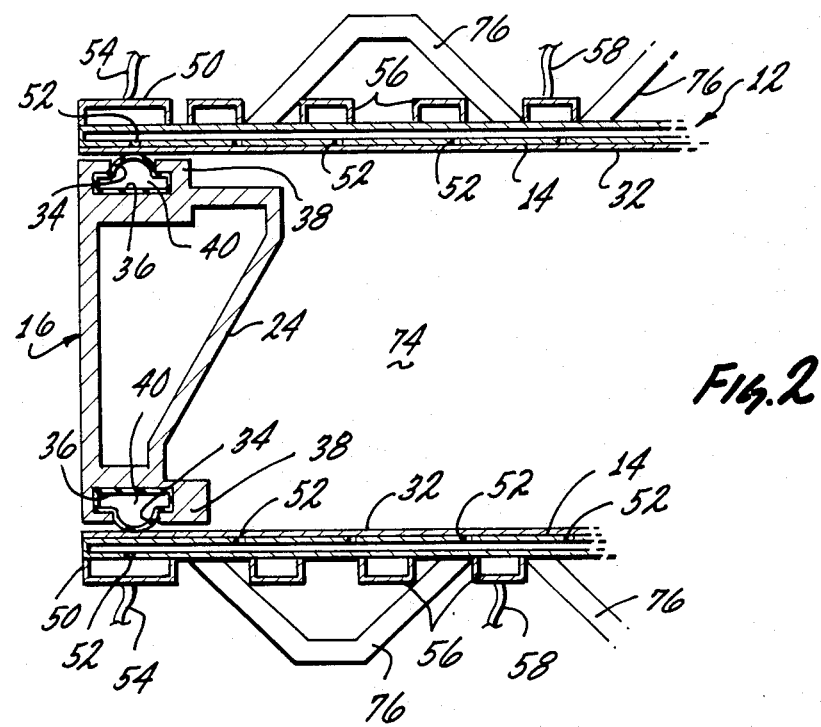
FIG. 2 is a cross-sectional view at an enlarged scale taken at line 2—2 of FIG. 1.

The apparatus illustrated in the drawing is constructed in accordance with the essentially intangible concepts or principles of the invention as set forth in various claims forming a part of this specification. From a careful consideration of this specification and of these claims it will be realized that the steps of the method of the present invention and that various specific details of an apparatus in accordance with this invention may be changed or modified in accordance with routine engineering skill and ability without departing from the broad concepts or principles of the invention defined in the claims.

DETAILED DESCRIPTION

In the drawing there is shown an apparatus 10 in accordance with this invention which is constructed so as to include two elongated parts or forms 12. These forms 12 include parallel, flat mold surfaces 14 which are spaced from one another. These surfaces 14 are preferably metal so as to be capable of easily conducting heat. The surfaces 14 are normally held separate and apart from one another by two separate spacers 16 which are positioned generally between the surfaces 14. These spacers 16 extend parallel to one another generally adjacent to side edges 18 of the surfaces 14 between ends 20 and 22 of these surfaces 14. These spacers 16 are considered quite important to the present invention.

Figure 4:
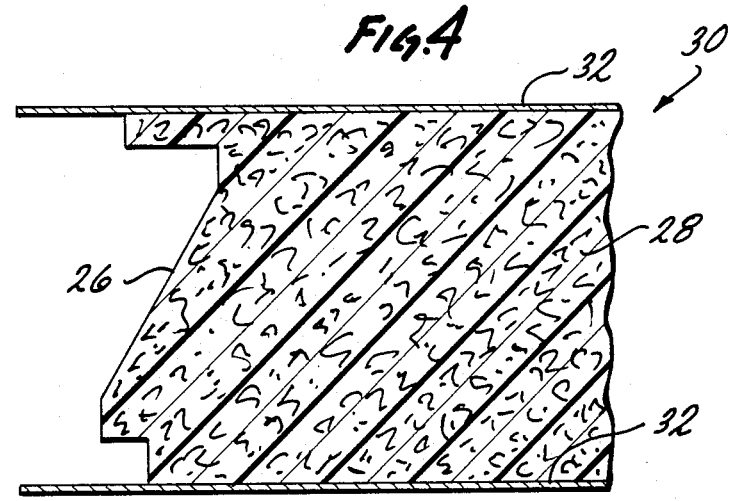
FIG. 4 is a partial cross-sectional view of a stress-skin panel produced using the apparatus shown in FIGS. 1 and 2.

These spacers 16 have a uniform cross-sectional configuration along their lengths and are preferably shaped so as to have generally inwardly directed surfaces 24 having a cross-sectional configuration corresponding to an edge 26 of a core 28 of a stress-skin panel 30 as shown in FIG. 4 in which parallel, flat sides 32 of the panel 30 take the form of flat "skins" such as sheets of aluminum. It is noted that these sides 32 extend outwardly of the edge 26 as shown in FIG. 4. When the edges 26 in a series of panels 30 are constructed as shown these panels 30 can be fitted together so that in effect the adjacent edges 26 and adjacent overlapping sides 32 constitute a structural joint uniting several of the panels 30 into a single unitary panel. In constructing such a joint an appropriate conventional adhesive (not shown) is preferably used to connect or bond the adjacent portion of the edges 26 and the overlapping portions of the sides 32. Similarly the panels 30 can be fitted to other correspondingly shaped structural members.

These spacers 16 preferably also include elongated slots 34 having enlarged heads 36 which extend along their lengths within surfaces 38 which are adjacent to mold surfaces 14. These slots 34 are adapted to contain hollow, elastomeric tubes 40 which extend slightly from the surfaces 38 under normal circumstances. These tubes 40 are attached to conventional air lines 42 in a conventional manner using couplings 44. These lines 42 may be used to either fill the tubes 40 with air so as to inflate them or for exhausting air from them so as to deflate them. The extremities (not separately numbered) of the tubes 40 remote from the lines 42 are preferably closed off by appropriate plugs 46 or similar structures.

This construction enables the tubes 40 to be inflated so as to extend outwardly in order to form seals with either the surfaces 14 or individual sides 32 held upon these surfaces 14 as hereinafter described. Movement of the forms 12 generally away from one another during the inflation of these tubes 40 is prevented by means of a series of conventional connectors or connecting means 48 which extend between the forms 12 generally adjacent to and outwardly from the side edges 18. A wide variety of different structures can be used as the connectors 48. Although common bolts can be used it is considered preferable to use conventional toggle clamps as the connectors 48 because such clamps may be easily manipulated in clamping the spacers 16 between the surfaces 14 and because they may be easily disassembled as required during use of the apparatus 10.

During such use the sides 32 are held on the mold surfaces 14 as shown in FIG. 2 so as to extend generally between the side edges 18 and the ends 20 and 22. Although it is possible to secure these sides 32 in place during the assembly of the apparatus 10 in a wide variety of ways, it is considered desirable to hold them in place on the surfaces 14 using a vacuum. This is because the use of such a vacuum minimizes any changes of the skins 32 becoming damaged during the use of the apparatus 10. Further, the use of a vacuum is advantageous in that the vacuum may be used to prevent any sagging of the sides 32 along the surfaces 14 prior to a panel 30 being formed.

The particular structure (not separately numbered) used in the apparatus 10 for holding the sides 32 in place by means of a vacuum consists of a series of hollow channels 50 located in each of the forms 12 generally adjacent to the mold surfaces 14. These channels 50 are connected to the mold surfaces 14 through the use of a series of holes 52 which are preferably located in a pattern extending completely across and throughout the mold surfaces 14. These holes 52 should be spaced closely enough to one another so that the sides 32 are held in place as shown through the use of a vacuum without any possibility of the sides 32 sagging between the individual holes 52. The channels 50 are, of course, connected to conventional vacuum lines 54 in any convenient manner.

The forms 12 each also include a plurality of other channels 56 which are located in close proximity to the mold surfaces 14 and which are located sufficiently close to one another along these mold surfaces 14 so that a fluid such as water may be circulated through them to maintain the mold surfaces 14 at a substantially constant or uniform temperature. Conventional hoses 58 may be used to supply fuid to the channels 56 in a conventional manner. The channels 56 in the forms 12 can be a single continuous channel in each form 12.

The apparatus 10 also includes an elongated rod or boom 60 which is slightly shorter than the distance between the two spacers 16. This boom 60 can be constructed in a number of different ways. It is provided with a plurality of outlets such as nozzles 62 which are connected by appropriate hoses 64 to a mixing structure or mixer 66 which in turn is connected to two supply lines 68. This boom 60 is also attached to two elongated cables 70 so that it may be located between the mold surfaces 14 adjacent to one of the ends 20 and may be pulled to adjacent to and if desired past the other ends 22 during the use of the apparatus 10 through the use of the cables 70. It is normally considered preferable to use another spacer 72 reasonably corresponding to a spacer 16 between the adjacent ends 20 of the mold surfaces 14 when the boom 60 is pulled generally away from these ends 20. Such a spacer 72 may or may not have a configuration corresponding to the configuration 26 depending upon the intended use of a panel 30.

During the intended use of the apparatus 10 the apparatus 10 is assembled as indicated in the drawing so that the sides or "skins" 32 are in place upon the mold surfaces 14 and are separated from one another by the spacers 16 and 72 so that in effect there is an internal space or cavity 74 between the mold surfaces 14. The boom 60 is then located within the space 74 adjacent to the spacer 72 with the nozzle 62 directed generally toward the spacer 72.

At this point a composition capable of automatically setting up or forming a porous rigid foam is supplied to the nozzles 62 through the supply lines 68 and the mixer 66. The initial quantities of the composition will be ejected against the spacer 72 and will tend to displace air from the internal space or cavity 74 automatically past the ends 22. The nozzles 62 are proportioned relative to the space 74 between the mold surfaces 14 and the spacers 16 so that this composition will be ejected in liquid form generally along a line extending perpendicular to the side edges 18 at various locations and in substantially equal amounts such that the space 74 will be filled with the composition in a substantially uniform manner along a line extending between the side edges 18.

As this occurs the cables 70 will be actuated so as to gradually move the boom 60 from away from the ends 20 to adjacent to and then out past the ends 22. The rate of movement of these cables 70 is considered quite important. They should be moved so that a substantially uniform quantity of the liquid composition used is located throughout the space 74. Further the boom 60 should be moved at a rate such that no pockets of entrapped air are located in the composition used to produce the core 28.

The uniform distribution of the composition used in the noted space 74 throughout the length and width of this space 74 is quite important in forming a core 28 which is of substantially a uniform character throughout the entire length and width of the panel 30 and between the sides 32. Although the uniform distribution of the liquid composition used is important in obtaining a core 28 with uniform characteristics, normally a number of other considerations are quite important in this regard.

This is because of the nature of compositions which are capable of being used in forming a core 28. A number of compositions of various different types can be employed. Thus, for example, the invention broadly can be considered as being applicable to the use of forming a core 28 of a porous, inorganic composition. It is, however, preferred to use the apparatus 10 with a conventional polyurethane composition which when emitted from the nozzles 62 is essentially liquid in character but which automatically forms a foam after it is emitted from the nozzles 62 and which sets up as a rigid, porous body as the foam is formed.

The reactions which take place with such a conventional polyurethane composition are normally exothermic in character. Further, the density of a core produced from such a composition will vary depending upon the temperatures and pressures of the liquid composition as the liquid composition sets up into a final porous solid state. As a results of these considerations it is considered quite desirable to carefully control virtually all factors which may influence the nature of the core 28 formed during the use of the apparatus 10.

Normally this involves a monitoring of and controlling of the temperature of the liquids supplied through the lines 68 to the mixer 66 where these liquids are mixed so as to form the final composition capable of setting up as indicated. This also involves the uniform deposition of material through the nozzles 62 as previously described. It further involves carefully controlling the temperature of the composition deposited generally between the surfaces 14 and the sides 32. This is accomplished by the circulation of a fluid such as water through the channels 56. Preferably any tendency of the sides 32 to cool such a composition is prevented by preheating the sides 32 prior to use to a temperature such that it will reasonably approximate the temperature desired for curing of the urethane composition as the urethane composition is placed in contact with these sides 32.

Since the surfaces 14 and the sides 32 are metal they are reasonably efficient for transferring heat so as to maintain the temperature of the composition deposited substantially uniform throughout the length and width of the space generally between the surfaces 14 and the sides 32. It is considered important that these surfaces 14 and the sides 32 should be sufficiently close together so that there is at best a comparatively minimal temperature differential in the composition deposited between that part of the composition generally approximately half-way between the sides 32 and that part of the composition immediately adjacent to the sides 32.

When the particular composition used is a polyurethane composition as indicated normally the composition will tend to exert a considerable expansive force generally against the sides 32 and the surfaces 14 as it forms a rigid porous body. It is considered important with the present invention to prevent such an expansive force from deflecting the surfaces 14 to any significant degree. Thus, when the apparatus 10 is intended to be used with such an expansive composition it is considered desirable to reinforce the forms 12 with what may be referred to as bridgework 76 supporting these forms so that they are not apt to deflect to any noticeable or significant extent. Such bridgework 76 may not be required when other compositions than a porous polyurethane composition are used.

After a composition as indicated has been deposited within the apparatus 10 liquid is normally circulated through the channels 56 in order to control temperature as described until such time as the composition has completely set up or hardened to a desired final character to form the core 28. Normally this liquid will be used for cooling purposes but with some compositions it may be desirable to use it for heating purposes. The amount of time required for this hardening will, of course, vary depending upon the precise composition used. After the composition has set up the apparatus 10 is disassembled, a complete panel 30 is removed and then is reassembled using new sides 32.

A number of minor expedients can be employed during the use of the apparatus 10 in order to facilitate the formation of panels such as the panels 30 of a desired character. Thus, for example, the sides 32 remote from the mold surfaces 14 may be coated with an appropriate coating (not shown) intended to improve adhesion to the core 28 formed. Similarly the sides 32 can, if desired, be of other than a completely flat configuration and may even include various projections (not shown) which will extend generally into a core 28 formed in order to provide a degree of mechanical bonding with a core 28 formed. If desired the apparatus 10 may be modified to produce curved panels 30 such as may be useful as parabolic reflectors and the like by simply shaping the forms 12 so that the mold surfaces 14 have a desired curved configuration. Expedients such as this are considered to be within routine skill of the field to which this invention pertains.

I claim:

1. A process for forming a stress-skin panel which comprises:
    holding the two skins of the panel to be manufactured against spaced mold surfaces,
    enclosing adjacent side edges and adjacent ends of said mold surfaces so as to form a cavity having closed sides, a closed end and an open end,
    locating a filling means comprising an elongated boom within said cavity adjacent to said closed end,
    concurrently supplying reactable liquid ingredients capable of forming a rigid porous core between said skins to said filling means, thereafter mixing said ingredients, and conveying the mixed ingredients into said cavity from said filling means in a substantially uniform manner along a line extending between said sides while concurrently withdrawing said filling means from adjacent said closed end through said cavity to said open end of said cavity at a rate such that a substantially uniform quantity of said mixture is deposited throughout said cavity by pulling on a flexible line means attached to said boom means.

2. An apparatus for use in producing a panel which includes:
    two elongated forms, each of said forms having a mold surface bordered by side edges and ends, said mold surfaces corresponding to one another in external dimension,
    connecting means for holding said forms so that said mold surfaces are spaced from one another and so that each side edge on one of said mold surfaces is adjacent to a side edge on the other of said mold surfaces and so that each of said ends on one of said mold surfaces is adjacent to an end on the other of said mold surfaces,
    spacing means for closing off the space between the adjacent side edges of said mold surfaces and for closing off the space between an end on one of said mold surfaces and the adjacent end on the other of said mold surfaces so as to define between said mold surfaces and a cavity having closed sides, a closed end and an open end,
    filling means for filling said cavity with a liquid composition capable of automatically setting up to form a porous core when located within said cavity,
    in which the improvement comprises:
    said filling means being of lesser dimension than the interior of said cavity and being capable of being moved within the cavity and including a mixer,
    supply line means for conveying said composition in liquid form through said open end to the mixer of said filling means,
    flexible transport means for pulling said filling means within said cavity from adjacent to said closed end through said open end as said liquid composition is supplied to said filling means through said supply lines means,
    said filling means comprising an elongated boom, nozzle means mounted on said boom along the length of said boom for filling said internal cavity in a substantially uniform manner along a line extending between said side edges as said transport means is used to move said filling means through said cavity from adjacent to said closed end through said open end, said supply line means being in communication with said nozzle means.

3. An apparatus for use in producing a panel which includes:
    two elongated forms, each of said forms having a mold surface bordered by side edges and ends, said mold surfaces corresponding to one another in external dimension,
    connecting means for holding said forms so that said mold surfaces are spaced from one another and so that each side edge on one of said mold surfaces is adjacent to a side edge on the other of said mold surfaces and so that each of said ends on one of said mold surfaces is adjacent to an end on the other of said mold surfaces,
    spacing means for closing off the space between the adjacent side edges of said mold surfaces and for closing off the space between an end on one of said mold surfaces and the adjacent end on the other of said mold surfaces so as to define between said mold surfaces and a cavity having closed sides, a closed end and an open end,
    filling means for filling said cavity with a liquid composition capable of automatically setting up to form a porous core when located within said cavity,
    in which the improvement comprises:
    said filling means being of lesser dimension than the interior of said cavity and being capable of being moved within the cavity,
    supply line means for conveying said composition in liquid form through said open end to said filling means,
    flexible transport means for pulling said filling means within said cavity from adjacent to said closed end through said open end as said liquid composition is supplied to said filling means through said supply lines means,
    said filling means comprising an elongated boom, nozzle means mounted on said boom along the length of said boom for filling said internal cavity in a substantially uniform manner along a line extending between said side edges as said transport means is used to move said filling means through said cavity from adjacent to said closed end through said open end, said supply line means being in communication with said nozzle means,
    said filling means also includes a mixing means located on said boom and connected to said supply line means, said nozzle means comprises a plurality of nozzles mounted on said boom so as to be spaced from one another, said filling means also includes hose means connecting said mixing means with each of said nozzles, said liquid composition is a fluid mixture of ingredients capable of forming a rigid, porous core as a result of a reaction between said ingredients, said supply line means serves to separately convey said ingredients to said mixing means and said mixing means serves to mix said ingredients so that they pass through said hose means after being mixed.

4. An apparatus for use in producing a panel which includes:

two elongated forms, each of said forms having a mold surface bordered by side edges and ends, said mold surfaces corresponding to one another in external dimension, connecting means for holding said forms so that said mold surfaces are spaced from one another and so that each side edge on one of said mold surfaces is adjacent to a side edge on the other of said mold surfaces and so that each of said ends on one of said mold surfaces is adjacent to an end on the other of said mold surfaces, spacing means for closing off the space between the adjacent side edges of said mold surfaces and for closing off the space between an end on one of said mold surfaces and the adjacent end on the other of said mold surfaces so as to define between said mold surfaces and a cavity having closed sides, a closed end and an open end, filling means for filling said cavity with a liquid composition capable of automatically setting up to form a porous core when located within said cavity, in which the improvement comprises:

said filling means being of lesser dimension than the interior of said cavity and being capable of being moved within the cavity, supply line means for conveying said composition in liquid form through said open end to said filling means, flexible transport means for pulling said filling means within said cavity from adjacent to said closed end through said open end as said liquid composition is supplied to said filling means through said supply lines means, said filling means comprising an elongated boom, nozzle means mounted on said boom along the length of said boom for filling said internal cavity in a substantially uniform manner along a line extending between said side edges as said transport means is used to move said filling means through said cavity from adjacent to said closed end through said open end, said supply line means being in communication with said nozzle means, each of said forms includes heat transfer means for regulating the temperature of the mold surface on it so as to indirectly regulate the temperature within said cavity.

5. An apparatus as claimed in claim 4 wherein:

each of said heat transfer means comprises channel means located within the form upon which it is located, said channel means being located adjacent to the mold surface of such form for use in circulating a fluid with respect to such mold surface.

6. An apparatus for use in producing a panel which includes:

two elongated forms, each of said forms having a mold surface bordered by side edges and ends, said mold surfaces corresponding to one another in external dimension, connecting means for holding said forms so that said mold surfaces are spaced from one another and so that each side edge on one of said mold surfaces is adjacent to a side edge on the other of said mold surfaces and so that each of said ends on one of said mold surfaces is adjacent to an end on the other of said mold surfaces, spacing means for closing off the space between the adjacent side edges of said mold surfaces and for closing off the space between an end on one of said mold surfaces and the adjacent end on the other of said mold surfaces so as to define between said mold surfaces and a cavity having closed sides, a closed end and an open end, filling means for filling said cavity with a liquid composition capable of automatically setting up to form a porous core when located within said cavity, in which the improvement comprises:

said filling means being of lesser dimension than the interior of said cavity and being capable of being moved within the cavity, supply line means for conveying said composition in liquid form through said open end of said filling means, flexible transport means for pulling said filling means within said cavity from adjacent to said closed end through said open end as said liquid composition is supplied to said filling means through said supply lines means, said filling means comprising an elongated boom, nozzle means mounted on said boom along the length of said boom for filling said internal cavity in a substantially uniform manner along a line extending between said side edges as said transport means is used to move said filling means through said cavity from adjacent to said closed end through said open end, said supply line means being in communication with said nozzle means, each of said forms include a holding means which is adapted to releasably hold the skin of a stress-skin panel against its mold surface, said holding means being capable of supporting said skins so they generally cover said mold surfaces.

7. An apparatus as claimed in claim 4 wherein:

each of said holding means comprises channel means in connection with a vacuum located in the form upon which it is located and a plurality of holes connecting it with the mold surface in such form, said holes being located substantially uniformly along such mold surfaces.

8. An apparatus for use in producing a panel which includes:

two elongated forms, each of said forms having a mold surface bordered by side edges and ends, said mold surfaces corresponding to one another in external dimension, connecting means for holding said forms so that said mold surfaces are spaced from one another and so that each side edge on one of said mold surfaces is adjacent to a side edge on the other of said mold surfaces and so that each of said ends on one of said mold surfaces is adjacent to an end on the other of said mold surfaces, spacing means for closing off the space between the adjacent side edges of said mold surfaces and for closing off the space between an end on one of said mold surfaces and the adjacent end on the other of said mold surfaces so as to define between said mold surfaces and a cavity having closed sides, a closed end and an open end, filling means for filling said cavity with a liquid composition capable of automatically setting up to form a porous core when located within said cavity, in which the improvement comprises:

said filing means being of lesser dimension than the interior of said cavity and being capable of being moved within the cavity, supply line means for conveying said composition in liquid form through said open end to said filling means, flexible transport means for pulling said filling means within said cavity from adjacent to said closed end through said open end as said liquid composition is supplied to said filling means through said supply lines means, said filling means comprising an elongated boom, nozzle means mounted on said boom along the length of said boom for filling said internal cavity in a substantially uniform manner along a line extending between said side edges as said transport means is used to move said filling means through said cavity from adjacent to said closed end through said open end, said supply line means being in communication with said nozzle means, said filling means also includes a mixing means located on said boom and connected to said supply line means, said nozzle means comprises a plurality of nozzles mounted on said boom so as to be spaced from one another, said filling means also includes hose means connecting said mixing means with each of said nozzles, said liquid composition is a fluid mixture of ingredients capable of forming a rigid, porous core as a result of a reaction between said ingredients, said supply line means serves to separately convey said ingredients to said mixing means and said mixing means serves to mix said ingredients so that they pass through said hose means after being mixed, each of said forms includes heat transfer means for regulating the temperature of the mold surface on it so as to indirectly regulate the temperature within said cavity, each of said forms include a holding means which is adapted to releasably hold the skin of a stress-skin panel against its mold surface, said holding means being capable of supporting said skins so they generally cover said mold surfaces.

9. An apparatus as claimed in claim 8 wherein:

each of said heat transfer means comprises channel means located within the form upon which it is located, said channel means being located adjacent to the mold surface of such form for use in circulating a fluid with respect to such mold surface, each of said holding means comprises channel means in connection with a vacuum located in the form upon which it is located and a plurality of holes connecting it with the mold surface in such form, said holes being located substantially uniformly along such mold surfaces.

* * * * *